Patented Feb. 4, 1947

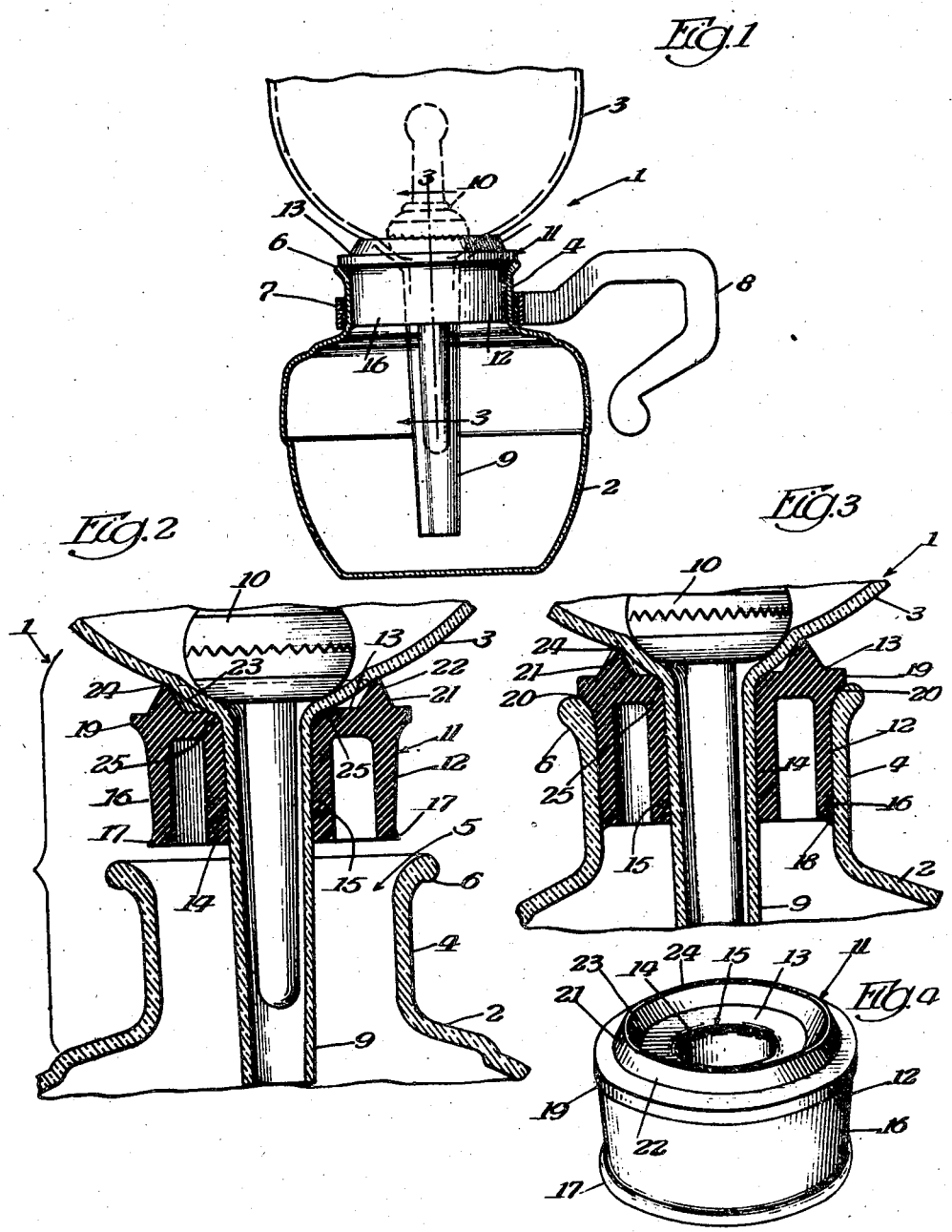

2,415,339

UNITED STATES PATENT OFFICE 2,415,339

PERCOLATOR

Wilbur D. Curtis, Studio City, Calif.

Application January 12, 1945, Serial No. 572,491

4 Claims. (Cl. 99—292)

1

This invention relates to percolators in general and particularly to percolators of the vacuum type for brewing beverages such as coffee. More specifically, the invention relates to a seal for making a tight fit between the neck of a lower percolator bowl and the stem of an upper bowl.

The primary object of the present invention resides in the provision of a new and novel seal member which can be applied readily and easily on the stem of the percolator upper bowl for sealing the upper bowl with respect to the lower bowl, there being improved means for effecting quick breaking of the seal when it is desired to disconnect the two bowls but maintaining a tight sealing connection between the bowls during normal use.

Another object of the invention is the provision of a new and novel seal member having a central cylindrical part which hugs the stem on the upper bowl so as to form an airtight seal therewith, there being an outer skirt part having a generally downwardly tapering part spaced from the cylindrical portion and providing a sealing element about the inside of the neck of the lower bowl or container, the skirt being so constructed and arranged that the seal between the outer surfaces of the skirt may be easily broken for removal of the upper bowl but maintaining a tight seal during normal use.

A further object of the invention is the provision of a seal member having a flexible skirt-like portion for the exterior sealing surface, there being a rib-like formation on the skirt to effect a positive seal between the outer surface of the seal member and the inner surface of the neck of the lower percolator container or bowl.

Still another object of the invention is the provision of an improved seal which compensates for unevenness or irregularity of the percolator parts to insure a good and proper seal connection at all times, which is easy to remove because of its flexibility, which will provide for proper contact with the upper bowl, which will accommodate bowl necks for various sizes, and which compensates for variation of wall thicknesses.

A still further object of the invention is the provision of a seal member for making a tight seal between the upper bowl and the lower bowl, the seal including an annular centrally located supporting surface to receive the lower surface of the upper bowl outwardly of the stem to form a seat for the upper bowl, said seal also including a flexible skirt-like portion with an annular external fin projecting therefrom at its extreme outer

2 lower end to make a tight seal between the lower bowl and the seal.

Numerous other objects and advantages will be apparent throughout the progress of the specification which follows.

The accompanying drawing illustrates a selected embodiment of the invention and the views therein are as follows:

Fig. 1 is a detail elevational view of a vacuum type percolator, and embodying the invention;

Fig. 2 is a detail vertical sectional view of the various parts of the percolator in detached or non-assembled position, the improved seal member, also shown in vertical section, being applied to the stem of the upper bowl or container;

Fig. 3 is a detail vertical sectional view on the line 3—3 of Fig. 1, and embodying the invention, the strainer-valve being shown in elevation;

Fig. 4 is a detail perspective view of the improved seal or seal member of the invention.

The particular construction herein shown for the purpose of illustrating the invention comprises a percolator 1, of the vacuum type, having a lower container or bowl 2 and an upper container or bowl 3.

The lower bowl 2 terminates at its upper end into a neck 4 having an opening 5. The upper end of the neck may flare outwardly as indicated at 6 to effect assembly easily of the parts and to permit easy pouring of the liquid into the bowl body 2. A band 7 may encircle the neck 4 of the lower bowl 2 and a handle 8, Fig. 1, may be secured operatively to the band to facilitate ease in pouring liquid from the bowl 2.

The upper container or bowl 3 has the usual opening at its upper end to receive ground coffee or other material from which beverage is to be brewed. The lower end of the bowl 3 terminates into the usual elongated downwardly extending hollow stem 9. The stem 9 is adapted to extend down into the lower container a proper distance for the usual purpose. A valve or strainer 10 is adapted to be arranged in the upper bowl 3 to strain the material into the upper bowl so that clear strained beverage will result in the lower bowl at the conclusion of the brewing operation. The valve 10 may be of the usual disc construction with a straining cloth, or it may comprise the newer gravity seated type, or any other type which is capable of performing the function intended. The particular type shown is the efficient, popular gravity seated disc type which employs one or more discs having serrated or non-smooth surfaces.

A seal 11 is interposed between the lower container 2 and the upper container 3 so as to make an airtight connection between the bowls. A central aperture is provided concentrically of the seal, and through which aperture the stem 9 of bowl 3 projects, as usual.

The seal 11 of the invention is made of rubber-like material, including rubber, either natural or synthetic, or any other flexible material capable of performing the function intended. The seal 11 comprises a body 12, Fig. 4, having a top 13 from which there extends integrally a central cylindrical part 14 defining a central bore 15 through which the bowl stem 9 fits in sealing relationship. A flexible skirt 16 surrounds the cylindrical part 14 and is spaced therefrom forming a chamber whereby the skirt 16 is free to flex. The inside of the skirt may be relatively straight while the outside tapers downwardly. The outside of the skirt is adapted to hug the inside of the neck 4 of the bowl 2, and, being flexible, the skirt will adapt itself to unevenness and irregularities and compensate for variations in wall thickness.

An outwardly extending annual web, protrusion or fin 17 is arranged at or near the bottom of the skirt 16, and this fin extends outwardly of the skirt. The fin 17 will compress and fit tightly against the inside of the neck 4 when in position, Fig. 3, and make a tight seal entirely about the neck as indicated at 18, Fig. 3. The flexibility or resiliency of the skirt 16 and the fin 17 definitely insures a positive tight seal between the skirt and the inside of the neck, the fin 17 terminating in a feather edge which is adapted to be compressed or squashed so as to assure definitely a tight seal regardless of irregularities, unevenness or variation of wall thickness.

An annular bead 19 is provided about the upper edge of the seal so as to assist in forming a seal at the point 20, Fig. 3, as well as to limit the inward movement of the seal in the neck 4. An upstanding annular rib 21, having upwardly extending inclined side walls 22—23, is formed on the upper surface of the top 13. The rib 21 terminates into an upper edge which provides a supporting ledge 24 for the upper bowl 3.

The upper bowl 3 has its stem 9 which passes through the central bore 15 and the internal surface of the cylindrical part 14 hugs the stem 9 and forms a positive tight seal between the seal member 11 and the upper bowl 3. Also, the relatively thin wall of the part 14 permits flexing so that unevenness, oversize or variation of wall thickness of stems may be accommodated. The underside of the bowl 3 is supported on the top 13 at the edge of the bore 15 as indicated at 25, as well as upon the ledge 24.

The two containers or bowls 2 and 3 are shown in their normal operating position in Figs. 1 and 3, and normally the seal 11 is left more or less permanently on the stem 9. During use the seal 11 becomes more or less frozen to the stem because the seal is subjected to heat from the heated liquid flowing both upwardly and downwardly during the brewing operation. The seal 11 is, therefore, normally allowed to remain applied to the stem 9 for convenience although it may be removed quite readily if desired. However, the sealing engagement between the skirt 16 and the inside surface of the neck 4 may be broken easily and quickly by merely tilting the upper bowl 3 at an angle to the vertical. The soft flexible wall of the skirt 16 gives or flexes upon vertical inclination of the bowl 3, causing the skirt to be compressed on one side and, therefore, be released on the other side whereupon the seal between the skirt and the neck will be broken, permitting the upper bowl 3 to be removed quickly and easily from the lower bowl 2. The flexible outer skirt 16, being spaced from the flexible inner skirt 14, provides a sealed construction which hugs the inside surface of the neck of the lower bowl and the outside surface of the stem of the upper bowl, respectively. The outer skirt may be loosened quickly from its sealing engagement with the neck when the upper bowl is tilted. Tilting of the upper bowl will flex or deflect the outer skirt, thereby permitting loosening of the seal with the neck and allowing the upper bowl to be removed quickly and easily. The seal, however, remains secured to the stem on the upper bowl as the tilting of the upper bowl will not cause detachment of the seal with the stem. When the upper bowl 3 is tilted, the deflection of the outer skirt 8 will occur because the bottom of the upper bowl rests upon the upper protruding rib 24. Therefore, when the upper bowl 3 is tilted, the upper bowl will press against the rib 24 and facilitate loosening of the seal from the lower bowl, and thereby permit easy removal of the upper bowl.

The seal 11 is preferably made in one piece, and the parts are so shaped as to permit the seal to be removed easily from its mold. The bowls 2 and 3 may be made of any material desired, such as vitreous material or metal, the drawings showing the parts being made of glass. Any type of valve 10 capable of performing the function required may be used, the drawings, however, showing a vitreous gravity seated member of the disc type.

The invention provides a seal for vacuum type percolators whereby provision is made to compensate for irregularities as to size, variations as to wall thickness, and unevenness of parts. The seal may be molded readily in one piece and at a cost no greater than present conventional seals which do not possess the advantages of the present seal. Also, the chamber between the part 14 and the skirt 16 will permit the pressure in the lower bowl to press those parts against the contacting parts of the stem and neck.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A coffee percolator comprising in combination a lower bowl having a neck opening, an upper bowl having a stem adapted to extend into the lower bowl below the neck thereof and a seal made of a resilient rubber-like material forming a stopper for the lower bowl and adapted in use to be inserted and removed from the neck thereof, the seal having an upper surface against which the upper bowl may seat to limit the extent to which said stem protrudes into the lower bowl, a cylindrical inner skirt adapted to embrace the stem, and a cylindrical outer skirt adapted to embrace the inner surface of the neck to the lower bowl, the outer skirt being spaced from the inner skirt so that it may flex and become loosened from the neck upon tilting of the upper bowl for ease of removal of the seal from the neck of the lower bowl.

2. A coffee percolator comprising in combination a lower bowl having a neck opening, an upper bowl having a stem adapted to extend into the lower bowl below the neck thereof, and a seal made of a resilient rubber-like material forming a stopper for the lower bowl and adapted in use to be inserted and removed from the neck thereof, the seal having a cylindrical inner skirt adapted to embrace the stem, and a cylindrical outer skirt adapted to embrace the inner surface of the neck of the lower bowl, the outer skirt being spaced from the inner skirt so that it may flex and become loosened from the neck upon tilting of the upper bowl for ease of removal of the seal from the neck of the lower bowl, the inner skirt extending down the stem a predetermined distance, and the outer skirt extending down the neck of the lower bowl a predetermined distance and in such proportion with the inner skirt that the inner skirt will be surrounded peripherally by the outer skirt and covered thereby, whereupon tilting of the upper bowl will inhibit loosening of the inner skirt from the stem and loosening of the outer skirt from the neck of the bowl is facilitated.

3. A coffee percolator comprising in combination a lower bowl having a neck opening, an upper bowl having a stem adapted to extend into the lower bowl below the neck thereof, a seal made of a resilient rubber-like material forming a stopper for the lower bowl and adapted in use to be inserted and removed from the neck thereof, the seal having a cylindrical inner skirt adapted to embrace the stem, and a cylindrical outer skirt adapted to embrace the inner surface of the neck of the lower bowl, the outer skirt being spaced from the inner skirt so that it may flex and become loosened from the neck upon tilting of the upper bowl for ease of removal of the seal from the neck of the lower bowl, the inner skirt extending down the stem a distance at least approximately as far as the outer skirt extends down the neck of the lower bowl so that upon tilting of the upper bowl loosening of the inner skirt from the stem is inhibited and loosening of the outer skirt from the neck of the bowl is facilitated, the outer skirt having an annular protrusion around its lower edge for a snug air tight fit with the inner surface of the neck when the seal is in place.

4. A coffee percolator as defined in claim 1 further characterized in that the seal has a protruding rib on its upper surface against which the upper bowl presses when it is tilted to facilitate loosening of the seal from the lower bowl for removal of the upper bowl.

WILBUR D. CURTIS.

REFERENCES CITED

The following references are of record in the file of this patent:

UNITED STATES PATENTS

| Number | Name | Date |
|---|---|---|
| 2,265,615 | Stalter | Dec. 9, 1941 |
| 2,100,487 | Marsden | Nov. 30, 1937 |
| 2,086,357 | Farber | July 6, 1937 |
| 1,117,961 | Phillips | Nov. 17, 1914 |
| 2,381,104 | Burnham | Aug. 7, 1945 |
| 2,174,466 | Kell, et al. | Sept. 26, 1939 |
| 2,289,498 | Hons | July 14, 1942 |
| 2,289,497 | Hons | July 14, 1942 |

FOREIGN PATENTS

| Number | Country | Date |
|---|---|---|
| 782,974 | French | 1935 |

Certificate of Correction

Patent No. 2,415,339.                                                                 February 4, 1947.

WILBUR D. CURTIS

It is hereby certified that error appears in the printed specification of the above numbered patent requiring correction as follows: Column 4, line 66, claim 1, for the word "to" after "neck" read *of*; and that the said Letters Patent should be read with this correction therein that the same may conform to the record of the case in the Patent Office.

Signed and sealed this 10th day of February, A. D. 1948.

[SEAL]

THOMAS F. MURPHY,
*Assistant Commissioner of Patents.*